No. 767,801. PATENTED AUG. 16, 1904.
W. DISCH.
TOBACCO PIPE.
APPLICATION FILED FEB. 20, 1904.
NO MODEL.
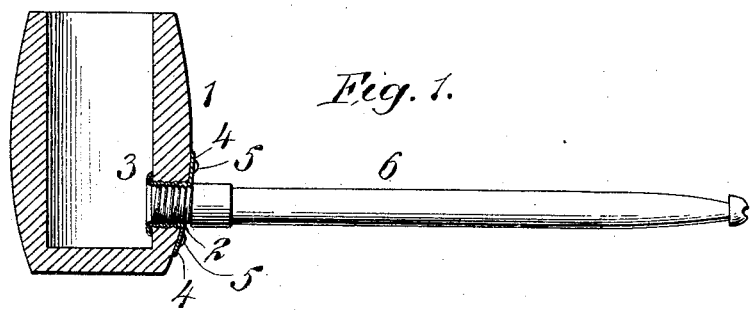
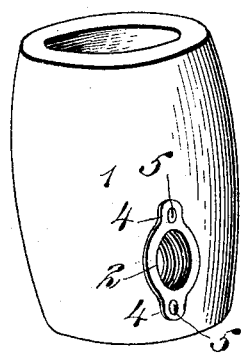
WITNESSES:
Geo. L. Disch
A. M. Pierce.
William Disch INVENTOR.

No. 767,801. Patented August 16, 1904.

UNITED STATES PATENT OFFICE.

WILLIAM DISCH, OF NEW YORK, N. Y.

TOBACCO-PIPE.

SPECIFICATION forming part of Letters Patent No. 767,801, dated August 16, 1904.

Application filed February 20, 1904. Serial No. 194,473. (No model.)

*To all whom it may concern:*

Be it known that I, WILLIAM DISCH, a citizen of the United States of America, and a resident of the city, county, and State of New York, have invented certain new and useful Improvements in Tobacco-Pipes, of which the following is a specification.

My invention relates especially to the construction of tobacco-pipes, particularly such as have a section of corncob for the bowl, and has for its object the provision of means whereby a stem may be effectually yet separably connected with such bowl.

To attain the desired end, my invention consists, essentially, in the combination, with a corncob bowl, of a screw-threaded eyelet made of sheet metal and held in place in a perforation in the bowl so that it cannot move therein and a pipe-stem adapted and arranged to be removably connected with said eyelet, all of which will be hereinafter first fully described and then pointed out in the claim.

In the accompanying drawings, forming a part hereof, is shown, in Figure 1, a vertical sectional view of a pipe embodying my invention. Fig. 2 is a perspective view of the bowl with the stem removed.

Similar numerals of reference wherever they occur indicate corresponding parts in both figures.

1 is a bowl of the pipe, made of corncob in the usual manner.

2 is a screw-threaded eyelet, formed of sheet metal, passing through a perforation near the bottom of said bowl and having its inner edge turned over or flanged, as at 3.

4 represents ears which project from the exterior flange, and 5 represents nails, screws, or rivets passing through said ears into the body of the pipe-bowl to prevent turning of the screw-threaded eyelet.

6 is a pipe-stem which removably screws into the eyelet fixed in the perforation of the bowl.

Heretofore in the making of corncob pipes much difficulty has been found in securing the stems to the bowls in a satisfactory manner. If held by glue or anything of a kindred character, the heat would soon destroy such a connection, allowing the bowl and stem to separate, and by the continued insertion and removal of a stem in a plain perforation the cob would soon wear away, so that the two parts would not hold together. If the stem projected within the bowl, it became charred and would readily come away from the bowl. By my construction all difficulties of this character are overcome, as the eyelet will remain permanent in position, permitting the insertion and removal of the stem for cleaning, &c., as often as is required, while the amount of metal employed, although very light, is sufficient to prevent the enlarging of the hole through the body of the pipe-bowl.

Having now fully described my invention, what I claim as new therein, and desire to secure by Letters Patent, is—

As a new article of manufacture, a pipe-bowl formed of natural corncob, in combination with a sheet-metal eyelet, said eyelet being provided with a turned holding-flange within the bowl, and perforated ears upon the exterior thereof, through which holding screws or pins pass and engage the body of the bowl, substantially as shown and described.

Signed by me at New York city this 25th day of January, 1904.

WILLIAM DISCH.

Witnesses:
GEO. W. DISCH,
JOHN J. BOGERT.